United States Patent [19]

Sandor

[11] Patent Number: 4,509,999

[45] Date of Patent: Apr. 9, 1985

[54] DRAUGHT EXCLUDING STRIPS

[76] Inventor: John Sandor, Spraylea, Sharmans Close, Harmer Green La., Welwyn, Hertfordshire, England, AL6 OAR

[21] Appl. No.: 579,854

[22] Filed: Feb. 13, 1984

[51] Int. Cl.[3] .......................... B32B 1/00; B32B 3/02; B32B 3/10

[52] U.S. Cl. ........................................ 156/71; 49/475; 428/40; 428/77; 428/157; 428/906

[58] Field of Search ................. 49/475, 480, 485, 496; 428/40, 41, 42, 317.3, 317.7, 906, 77, 78, 157; 156/71

[56] References Cited

U.S. PATENT DOCUMENTS

| | | | |
|---|---|---|---|
| 3,117,902 | 1/1964 | Holzheimer | 428/41 |
| 3,840,266 | 10/1974 | Carlson | 428/41 |
| 4,126,966 | 11/1978 | Lobell | 428/81 |

FOREIGN PATENT DOCUMENTS

| | | | |
|---|---|---|---|
| 1074095 | 6/1967 | United Kingdom | 49/475 |
| 2106576 | 4/1983 | United Kingdom | 428/41 |

*Primary Examiner*—William J. Van Balen
*Attorney, Agent, or Firm*—Michael J. Striker

[57] ABSTRACT

A draught excluding strip comprises a resilient foam strip having two flat parallel faces and a securing strip attached to one flat face of the foam strip, the securing strip at least partially overlying the foam strip and projecting beyond the said one flat face along the proximate edge thereof. The strip has an adhesive layer covered with a release paper and the other flat face of the foam strip can be covered with a plastics film. In use the proximate edge is compressed to cause the distal edge of the foam strip to move away from the surface to which the strip is attached.

13 Claims, 5 Drawing Figures

DRAUGHT EXCLUDING STRIPS

TECHNICAL FIELD

This invention relates to draught excluding strips of the kind used to close off a gap between a door or window and the frame thereof. Preferred embodiments of the invention relate to self-adhesive draught excluding strips which are adjustable in use to accommodate to a range of different sizes of gap.

DISCUSSION OF PRIOR ART

There are essentially three types of draught excluding strip to fit around doors and windows (if one ignores the various sealant pastes), i.e. sprung strip, flexible strip and compressible self-adhesive strip. Of these, the last one generally consists of an expanded thermoplastic or elastomer with an open cell structure, whilst sprung strips and flexible strips are made of solid materials. Usually, the sprung strip is a metal strip, but it can also be made in plastic or rubber; it fits into the gap between the jamb or lintel on the one hand and the door or window on the other; it gets squeezed into the gap by the closing action of the door or window. This type has a number of important advantages over the others, e.g. it is the least unsightly, it can be used on both inward and outward opening doors or windows with or without rebate, and can also be used on sash windows.

The existing sprung strips have several disadvantages. The metal sprung strip is difficult to handle, it requires nails or screws for fixing and needs a tool for initiating the spring action. If made in plastic, it requires a separate flap of a suitable elastomer which must be inserted or otherwise fixed to a rigid or semirigid plastic or metal strip. Furthermore, special problems arise with the existing types where the gap is uneven and more especially if in places the gap is 0.5 mm or smaller.

The foregoing disadvantages also affect the packaging, storing and displaying of the product, in contrast to a completely flexible strip which can be rolled up and satisfactorily retailed in a cheaper packaging.

BRIEF STATEMENT OF INVENTION

According to one aspect of the invention a draught excluding strip comprises a resilient foam strip having two parallel flat faces and a securing strip attached to the foam strip, the securing strip at least partially overlying one of said flat parallel faces of the foam strip and projecting beyond the foam strip along one edge (the proximate edge) thereof, the surface of the securing strip projecting beyond the foam strip on the same side as the foam strip being coated with a self-adhesive material, the coating of self-adhesive material being protected with a removable cover strip so that fixing the draught excluding strip in place, merely involves removing the cover strip and pressing the thus-exposed self-adhesive coating onto the member to which the draught excluding strip is to be attached.

In use of a draught excluding strip according to the invention, the securing strip is fixed to one of the two relatively movable members between which the gap to be sealed occurs (e.g. to the frame of a door or window) and compresses the proximate edge of the foam strip against said one member.

The removable cover strip can be paper coated with a release agent and the securing strip can be a thin plastics strip having little inherent rigidity. With this arrangement a natural bending up of the foam strip from the plane of the said one member occurs automatically as the proximate edge region of the foam strip is compressed against the said one member by the action of sticking the securing strip against the said one member. The angle of inclination of the foam strip to the stuck-down region of the securing strip can be controlled by varying the degree of compression of the proximate edge region of the foam strip which in turn is controlled by the width of the edge region of the securing strip closest to the said proximate edge which has not been adhesively secured to the said one member. Thus, in practice, the preferred form of draught excluding strip according to the invention, can be adjusted to any given gap width (between the thickness of the foam strip and its width) by running (say a thumb nail) closer and closer to the covered proximate edge of the foam, thereby reducing the width of the said edge region of the securing strip, increasing the degree of compression of the proximate edge region of the foam strip and causing the distal edge of the foam strip to move further and further away from the plane of the said one member.

Conveniently the flexible securing strip extends across the entire width of the foam strip to its distal edge, the width of the securing strip being of the order of twice the width of the foam strip. Polypropylene, polyester, polyethylene or nylon are suitable materials for the securing strip. The foam strip can be closed or open cell material, such as expanded polyethylene, expanded polyurethane, expanded polyether, expanded PVC or natural or synthetic foam rubber.

In a typical case the securing strip can be 22 mm wide and 100 microns thick and the foam strip can be 11 mm wide and 2 mm thick (uncompressed).

In an alternative embodiment, the securing strip can be made of a material with a substantial degree of inherent rigidity so that the natural "bend-up" effect of compressing the proximate edge of the foam strip is augmented by a pre-creasing of the securing strip. In such an alternative embodiment, the securing strip could be of metal but thicker grades (e.g. 150 microns and above) of the same plastics materials discussed above are preferred. A measure of pre-creasing may be effected during production of the draught excluding strip, but there are advantages in packaging if the material is supplied with the sealing strip coplanar and the user instructed to effect the required degree of pre-creasing prior to application.

The presence of a foam strip on the distal edge of the installed draught excluding strip reduces the risk of the strip vibrating in the audible range of frequencies when installed in a gap subjected to strong draughts.

The securing strip can be transparent (to allow the colour of the underlying said one member to show through) or coloured to match the underlying one member. If open cell material is used for the foam strip, the face thereof which is not attached to the securing strip can be covered with a film of plastics material.

BRIEF DESCRIPTION OF DRAWINGS

Embodiments of the invention will now be further described, by way of example, with reference to the accompanying drawings, in which.

DESCRIPTION OF PREFERRED EMBODIMENTS

Figure 1:
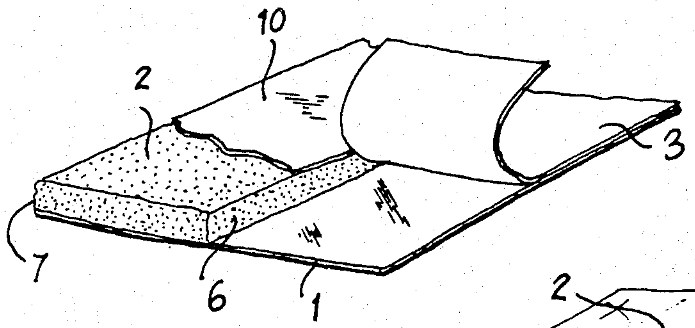
FIG. 1 is an isometric view of the underside of a first embodiment of draught excluding strip according to the invention.

Referring to FIG. 1 the draught sealing strip comprises a flexible self-adhesive strip 1, one half of which is secured to a foam strip 2 and the other half of which is covered with a release paper 3 (shown partly removed).

Figure 2A:
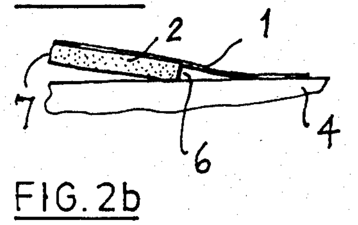
FIGS. 2*a* and 2*b* are sectional views showing the strip of FIG. 1 secured in place to provide sealing in gaps of two different widths.
Figure 2B:
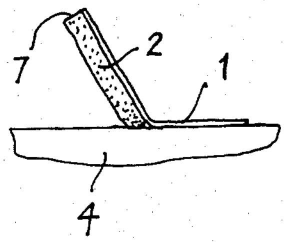

FIG. 2*a* shows the strip 1 secured in place on a flat member 4 with only a small degree of compression of the proximate edge 6 of the strip 2, the distal edge 7 of the strip 2 being lifted approximately one foam strip thickness from the member 4. FIG. 2*b* shows the effect of sticking the strip 1 to the member 4 closer to the edge 6, thereby lifting the distal edge 7 much further from the plane of the member 4.

Figure 3:
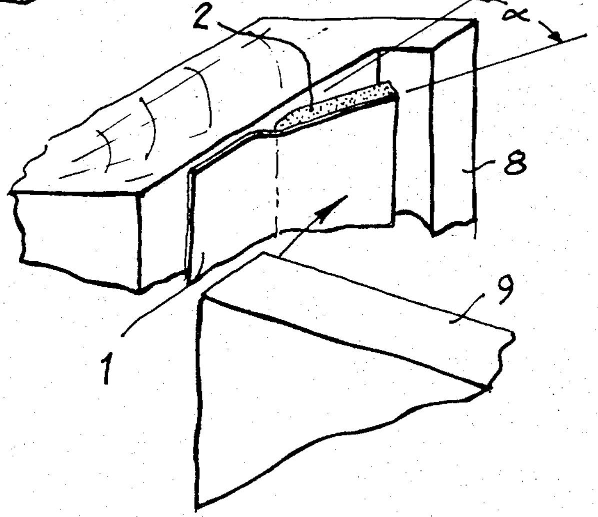
FIG. 3 is a schematic view of the strip of FIG. 1 shown in place in the frame of a window or door.

FIG. 3, shows the strip in place in a frame 8. The closing direction of the door or window 9 is shown by the arrow and the angle $\alpha$ is chosen large enough to close the gap which occurs between 8 and 9 in the closed condition of the door or window.

Figure 4:
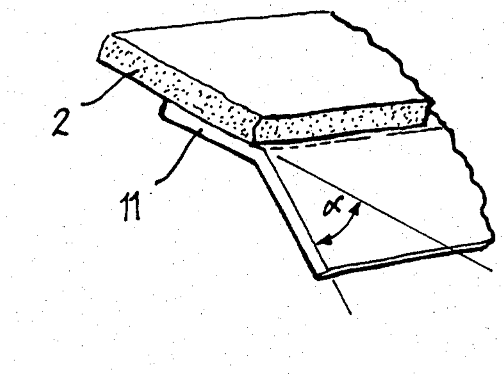
FIG. 4 is an isometric view of a second embodiment of draught excluding strip in accordance with the invention.

FIG. 4 is similar to FIG. 1 and shows a second embodiment with no self-adhesive coating and with a securing strip 11 which only partly covers the foam strip 2 and is rigid enough to be pre-bent to approximately the required angle $\alpha$ prior to fixing in place (e.g. with a separately applied adhesive or with nails).

The thin film 10 shown in FIG. 1 can be used to seal the underside of the foam strip 2 (to stop it adhering to the frame 8 when the door or window 9 is kept closed for long periods) and provide a wipe-clean facility.

Compression of the proximate edge 6 of the foam strip 2 thus creates a spring action that allows the foam strip 2 to fill a gap several times its own thickness. At the same time, on closing up this gap (e.g. closing the door or window 9) the foam strip will be bent back and further compressed. If installed in the correct manner, the foam strip 2 will recover sufficiently to close the original gap when the pressure on the foam strip is removed. This cycle can be repeated virtually indefinitely.

A preferred form of draught excluding strip is constructed in the manner shown in FIG. 1 but without the thin film 10. The foam strip 2 is some 10 mm wide and 2 mm thick and is made of cross-linked expanded polyethylene. The securing strip is a polyester some 20 mm wide and approximately 50 microns thick.

Employing draught excluding strips according to the invention, gaps up to 12 mm can effectively be sealed against draught using a foam strip 2 no more than 14 mm wide and approximately 2 mm thick. Wider strips will probably give effective sealing in wider gaps. The strip 1 need only be wide enough to reliably secure the foam strip in place. The adhesive should be strong enough to permit the desired compression of the proximate edge 6 to be maintained over a long period (e.g. a few years).

It is possible to modify the embodiments of FIGS. 1 and 4 by providing, along the meeting line between the foam strip 2 and the securing strip 1, a shoulder or fillet which may be made of the same material as the securing strip or the foam strip, or it may be made of a different material. The filler can assist in the bending up of the foam strip when the securing strip is fixed in place.

To prevent possible creep of adhesive onto the distal edge 7 of the foam strip 2 in FIG. 1 (e.g. after prolonged periods of compression) the strip 2 can protrude slightly (e.g. by 2 mm) beyond the edge of the strip 1.

It will be appreciated that many changes can be made to the specific embodiments described without departing from the spirit and scope of the following claims.

What is claimed is:

1. A draught excluding strip comprising:
a resilient foam strip having two parallel flat faces;
a securing strip attached to the foam strip so that the foam strip is arranged at one side of the securing strip, the securing strip at least partially overlying one of said flat parallel faces of the foam strip and having a portion projecting beyond the foam strip, along only one edge thereof;
a coating of a self-adhesive material arranged on the portion of the securing strip projecting beyond the foam strip on the one side of the securing strip; and
a cover strip protecting the coating of self-adhesive material so that fixing the draught excluding strip in place merely involves removing the cover strip and pressing one region of the thus-exposed self-adhesive material onto a member to which the draught excluding strip is to be attached, while increasing an effective thickness of the draught excluding strip, to seal a gap, involves reducing the width of another region of the securing strip which is closest to the one edge of the foam strip and is not adhesively secured to anything, thereby increasing the compression of the one edge and causing lifting up of the foam strip at an angle relative to the member.

2. A draught excluding strip as claimed in claim 1, in which the securing strip extends entirely across one flat parallel face of the foam strip to a distal edge.

3. A draught excluding strip as claimed in claim 1, in which the securing strip has a width of the order of twice the width of the foam strip.

4. A draught excluding strip as claimed in claim 1, in which the securing strip is selected from the group consisting of a polypropylene, a polyester, a polyethylene and a nylon tape.

5. A draught excluding strip as claimed in claim 1, in which the foam strip is selected from the group consisting of expanded polyethlene, expanded polyurethane, expanded polyether, expanded PVC, natural foam rubber and synthetic foam rubber.

6. A draught excluding strip as claimed in claim 1, in which the securing strip has a thickness in the order of 50 microns and the foam strip, measured between said two parallel flat faces, has a thickness in the order of 2 mm in an uncompressed state.

7. A draught excluding strip as claimed in claim 1, in which the securing strip has little inherent rigidity.

8. A draught excluding strip as claimed in claim 1, in which the securing strip is made with a substantial degree of inherent rigidity and resilience so that the lifting up effect of compressing the one edge of the foam strip is augmented by a pre-creasing of the securing strip.

9. A draught excluding strip as claimed in claim 1, in which the securing strip is transparent.

10. A draught excluding strip as claimed in claim 1, in which the flat face of the foam strip parallel to the face adhered to the securing strip is covered with a film of plastics material.

11. A draught excluding strip, comprising:

a resilient foam strip of rectangular cross-section having a pair of opposite wide parallel faces;

a securing strip attached to and overlying one of the wide parallel faces so that the foam strip is arranged at one side of the securing strip, and having a portion projecting beyond the foam strip along only one edge thereof, that part of the securing strip projecting beyond the one edge having a width comparable to the width of that part of the securing strip attached to the foam strip;

a coating of a self-adhesive material arranged on the portion of the securing strip projecting beyond the foam strip on the one side of the securing strip; and a removable release paper protecting the coating of self-adhesive material so that fixing the draught excluding strip in place merely involves removing the release paper and pressing a region of the thus-exposed self-adhesive material onto a member to which the draught excluding strip is to be attached, while increasing an effective thickness of the draught excluding strip, to seal a gap, involves reducing the width of another region of the securing strip which is closest to the one edge of the foam strip and is not adhesively secured to anything, thereby increasing the compression of the one edge and causing lifting up of the foam strip at an angle relative to the member.

12. A draught excluding strip as defined in claim 1, wherein the securing strip is creased along and in immediate proximity to the one edge of the foam strip.

13. A method of attaching a draught excluding strip, comprising the steps of:

providing a resilient foam strip having two parallel flat faces, a securing strip attached to the foam strip so that the foam strip is arranged at one side of the securing strip, the securing strip at least partially overlying one of the flat parallel faces of the foam strip and having a portion projecting beyond the foam strip along only one edge thereof, a coating of a self-adhesive material arranged on the portion of the securing strip projecting beyond the foam strip on the one side of the securing strip, and a cover strip protecting the coating of self-adhesive material;

pressing one region of the thus-exposed self-adhesive material onto a member to which the draught excluding strip is to be attached; and reducing the width of another region of the securing strip, which is closest to the one edge of the foam strip and is not adhesively secured to anything, thereby increasing compression of the one edge of the foam strip and causing lifting up of the foam strip at an angle relative to the member to seal larger gaps.

* * * * *